United States Patent

[11] 3,623,068

[72] Inventors Thomas B. Horgan Kingston; Lawrence G. Mosher, Rhinebeck; Charles E. Mullery, Saugerties, N.Y.; Charles E. Newcomb, Norwood, Mass.

[21] Appl. No. 789,749
[22] Filed Jan. 8, 1969
[45] Patented Nov. 23, 1971
[73] Assignee International Business Machines Corporation Armonk, N.Y.

[54] SERVING DISPLAY FUNCTIONS BY MEANS OF CODED SPACE INFORMATION
9 Claims, 10 Drawing Figs.

[52] U.S. Cl. .......... 340/324 A, 178/4.1, 178/23
[51] Int. Cl. .......... G06f 3/14
[50] Field of Search .......... 340/324.1; 178/4.1, 17 B, 26.5, 23, 25

[56] References Cited

UNITED STATES PATENTS

| | | | |
|---|---|---|---|
| 2,969,429 | 1/1961 | Punyaratband et al. | 178/25 |
| 2,974,193 | 3/1961 | Yamura et al. | 178/25 |
| 3,304,366 | 2/1967 | Clark et al. | 178/23 |
| 3,493,928 | 2/1970 | Juliusburger | 178/23 |
| 3,307,156 | 2/1967 | Durr | 340/324.1 |
| 3,382,487 | 5/1968 | Sharon et al. | 340/324.1 |

*Primary Examiner*—John W. Caldwell
*Assistant Examiner*—Marshall M. Curtis
*Attorney*—Hanifin and Jancin

ABSTRACT: Disclosed is a display system including a regenerative display and a memory where the memory provides the information which is displayed. The memory addresses have a one-for-one correlation with the display addresses. Each word obtained from a memory address is displayed, when it contains a character code, at its corresponding display address. Each word in memory can store a character code defining a character to be displayed or a function code defining a regenerative function to be performed. The function codes are placed in only those memory locations, adjacent locations containing character information, which contain an indication that nothing (i.e., a space) is to be displayed. A control field in each memory word is employed to designate the nature of the particular word stored, that is, to designate whether a function code, character code or some other code is stored in that word. Using control fields allows those words which normally contain only space indications to be beneficially used to contain function codes. The function codes, of course, are decoded in a different manner from the character codes.

INVENTORS
THOMAS B. HORGAN
LAWRENCE G. MOSHER
CHARLES F. MULLERY
CHARLES E. NEWCOMB

BY David E. Lovejoy

ATTORNEY

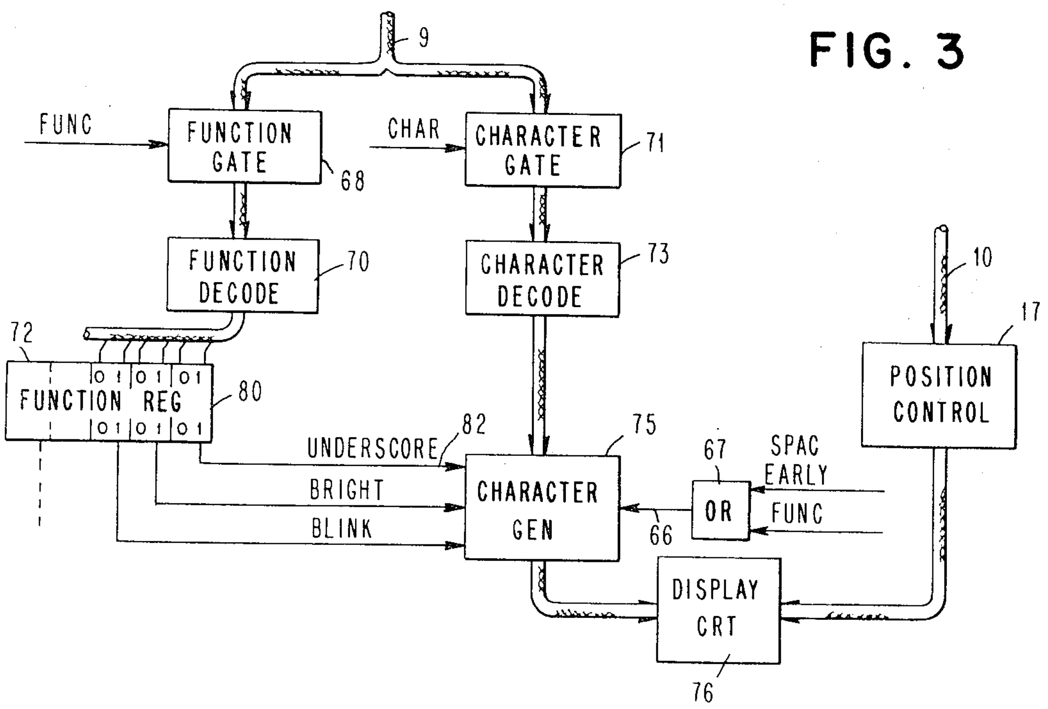
FIG. 3
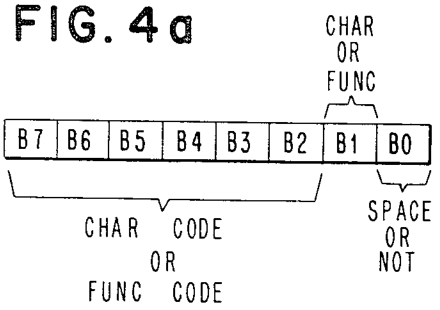
FIG. 4a
FIG. 4b
| B0 | B1 | MEANING |
|---|---|---|
| 0 | | TRUE SPACE |
| 1 | 0 | FUNC |
| 1 | 1 | CHAR |
FIG. 5
REGISTER LOCATION
| TIME | | | A | B | C | D | E | F | G | H |
|---|---|---|---|---|---|---|---|---|---|---|
| 0 | 0 | 0 | B0 | | | | | | | |
| 0 | 0 | 1 | B1 | B0 | | | | | | |
| 0 | 1 | 0 | B2 | B1 | B0 | | | | | |
| 0 | 1 | 1 | B3 | B2 | B1 | B0 | | | | |
| 1 | 0 | 0 | B4 | B3 | B2 | B1 | B0 | | | |
| 1 | 0 | 1 | B5 | B4 | B3 | B2 | B1 | B0 | | |
| 1 | 1 | 0 | B6 | B5 | B4 | B3 | B2 | B1 | B0 | |
| 1 | 1 | 1 | B7 | B6 | B5 | B4 | B3 | B2 | B1 | B0 |

SERVING DISPLAY FUNCTIONS BY MEANS OF CODED SPACE INFORMATION

BACKGROUND OF THE INVENTION

The field of the invention is information display systems such as commonly employed with or in control of information-handling systems. More particularly, the invention relates to display systems which include a display such as a cathode-ray tube (CRT), and a memory for storing the information to be displayed.

In general, prior art displays include a screen or other optical output for displaying a two-dimensional optical image. The image, such as that displayed on a CRT, is conveniently organized into an XY-array where every location on the screen is resolved into an X-coordinate and a Y-coordinate. When the image to be displayed consists of alphanumeric type information, the X- and Y-coordinates are grouped into small discrete areas on the screen where each area is defined by a row and column position. Each discrete area (display location) may be suitably energized to display one of the alphanumeric characters. A plurality of the characters positioned side by side in adjacent display locations in a row may display, for example, a conventional English language word. Spaces between English language words are created by not energizing particular display locations in selected rows and columns. In general then, selected characters and spaces (which may be identified by space characters) are positioned in the order desired on the display screen at selected row and column addresses to form an overall composite image which is similar to a page in a book. While a character set, such as the conventional alphanumerics mentioned, includes a plurality of discrete characters where only a single character may be positioned at each display address (i.e., at each row and column location), the operation can be modified to include graphic modes where the X- and Y-coordinate information may be more refined than mere row and column addressing and the information displayed may be other than characters such as lines and curves.

Within a display unit per se, such as a CRT, characters or other information to be displayed are generated and positioned at the appropriate place on the screen using a number of conventional techniques. For example, stroke generators and dot matrix generators are well known for creating characters to be displayed on a CRT. Similarly, suitable X- and Y-coordinate positioning controls are known for use in display systems.

In CRT operation, the cathode-ray beam is conventionally scanned across the XY-coordinates to form the CRT image. The scan is under control of a character generator and XY position control circuitry. One complete scan (display cycle) of the CRT screen by the cathode-ray beam forms the image. The scan is continuously repeated to regenerate the image. The regeneration during each display cycle may include the same information yielding the same image or alternatively may include new information yielding a modified (or completely new) image.

In order to regenerate the image on the display screen, it is desirable to employ a store or memory which maintains a record of what is to be displayed. Memories for this purpose in the prior art are constructed from conventional delay lines, magnetic cores, and other well-known devices which are suitably organized and connected to deliver, during each display cycle, those characters which form the composite image. As previously indicated, a display screen is conveniently thought of as organized into an array where each discrete location on the screen is defined as having a display address (i.e., a row and column position). Similarly, memories are also generally array-type devices where the information in the memory has a memory address. In general, displays having a memory for regeneration require the existence of means for correlating the memory addresses which contain information to be displayed with the display addresses at which the stored information is to be displayed.

While some prior art devices actually record display addresses within the memory locations per se, some prior art devices and the present invention employ a convention of mapping the memory addresses on a one-for-one basis with the display addresses. More particularly, the memory is organized in an array of words (one display character per memory word) located with memory row and column addresses where each word address has a corresponding display address. For example, a word in column 1 row 1 of the memory will always be displayed as a character at row 1 column 1 on the display screen. By employing this one-for-one mapping technique, the problem of determining where to display character words read from memory is greatly simplified since the memory-addressing circuitry may be employed to simultaneously control the positioning controls of the display. Because of the one-for-one mapping, no display addresses need be stored in the memory and accordingly the size of the memory may be economically reduced.

Another area of general concern in information display systems is the implementation of functions, that is, control operations which enter, identify, modify, delete, or otherwise manipulate the information which is being displayed. For example, such functions include underscoring all the words in a particular sentence of an English language text, highlighting (brightening) particular words or characters, or protecting a particular field (one or more adjacent display locations on the screen) from modification. Functions (control operations) may be arbitrarily classified as regenerative, where they are repeated each display cycle or limited occurrence (e.g., single occurrence in many display cycles). An erase operation is an example of a limited occurrence function since it would only be performed once and would not usually be repeated in each display cycle. An underscore operation for underscoring several characters or words is an example of a regenerative function since the underscore is repeated during each display cycle until at some subsequent time the underscore function is removed.

Prior art systems which have employed a one-for-one mapping relationship between memory addresses and display addresses have a number of detriments. For example, many prior art systems do not provide regenerative functions as desired. Other prior art systems employ extensive external program control to implement regenerative functions. Still other prior art systems include function fields along with character fields in each word of memory in order to implement regenerative functions. Those prior art systems which employ external program control of the display system are elaborate and not as economical as desired. Those devices which have added a function field as well as a character field to every memory word uneconomically require a memory of much greater size since, when no function is to be performed, the space in memory for those function fields is wasted.

In accord with the above discussion of the prior art, it is an objective of the present invention to provide a display system which maintains the advantage of having a one-for-one mapping between memory addresses and the display addresses while simultaneously providing regenerative functions without incorporating the detriments attendent the prior art.

SUMMARY OF THE INVENTION

The present invention is a display system including a regenerative display, such as a CRT, and a memory where the memory provides the information which is displayed. The memory addresses have a one-for-one correlation with the display addresses (display locations) at which the words obtained from those memory addresses are displayed. In accord with that one-for-one correlation, each word location in memory corresponds to a discrete display location on the display screen. Each word in memory can store a character code defining a character to be displayed or a function code defining a regenerative function to be performed. The regenerative function codes are placed in only those memory locations which normally would contain a space character or other indication that nothing is to be displayed. By placing function codes in the space locations, none of the character information is lost while economically using those "empty" word locations for useful purposes.

Since each location in memory may contain a regenerative function code or a character code and since there is a one-for-one mapping between each memory word location and each display location, means are provided, in accordance with the present invention, for detecting from the readout of each word from memory whether or not that particular word contains a character code, contains a function code, or contains some other designation. If the word read out identifies a character, the word is gated to the display and the character is generated and displayed in the normal manner. If however, the word read out identifies a function, the function is implemented while simultaneously sending a space indication to the display causing the display to generate a space.

One manner of implementing the determination as to whether or not a character or a function exists is by including an extra bit in each word of memory. If that bit is a one, for example, a character indication is generated and the word is decoded as a character. If that indication is a zero, the word is decoded as a function.

The present invention, in summary, employs a control field in each memory word to designate the nature of the word stored. By using the control field, the space words which normally exist between words containing character codes are at times employed to contain function codes. The function codes are decoded in a different manner from the character codes.

In accordance with another aspect of the present invention, a two-bit control field is employed. The first bit of the control field in each memory word is used to indicate when set to one value (e.g., zero), that the word is a space and therefore need not be decoded or, if set to another value (e.g., one), that the word is either a character or a function and should be decoded. The second bit in the control field is then used to designate, when set to one value, that the word is a function and, when set to another value, that it is a character. When the memory device is a serially readout core, means are provided for immediately detecting the value of the first bit read out. If that first bit value indicates that a true space (neither a function nor a character) is contained therein then the address circuitry for the memory is incremented to the next word without reading out the remaining bits and a space signal is indicated to the display. Since the display device can generally display a space (that is, display nothing on the screen) faster than it can display a character, the incrementing of the memory address speeds up the display and memory operations. If the image being displayed includes many spaces, as is normally the case when text material is displayed, the display cycle is significantly and advantageously shortened.

It is apparent from the above summary of the invention that the objective of providing an improved display system having memory addresses mapped one for one with display addresses while still including the implementation or regenerative functions without resort to expensive prior art techniques is achieved.

The foregoing and other objects, features and advantages of the invention will be apparent from the following more particular description of preferred embodiments of the invention, as illustrated in the accompanying drawings.

DESCRIPTION OF THE DRAWINGS

FIG. 3 depicts the function decoder and the character decoder circuitry which are alternatively used to decode the contents of the output register, in response to the control field decoder output, in order to appropriately energize the display unit.

FIG. 4*a* depicts the word format of words stored in memory.

FIG. 4*b* defines the control field (BO, B1) code meaning for every memory word.

FIG. 5 depicts the shifting of each word through the various stages of the output register of FIG. 1 as a function of time as measured by counter intervals.

DETAILED DESCRIPTION

In implementing the use of a control field for specifying the nature (e.g., space, function, character), many conventional prior art devices may be employed as building blocks for the invention. For example, delay line memories, magnetic core memories, core memories with parallel readout of words or many other such memories may be employed. Similarly, the actual display unit may include a CRT, a dot matrix of incandescent or solid state lamps, a holographic device or many other such devices.

Figure 1:
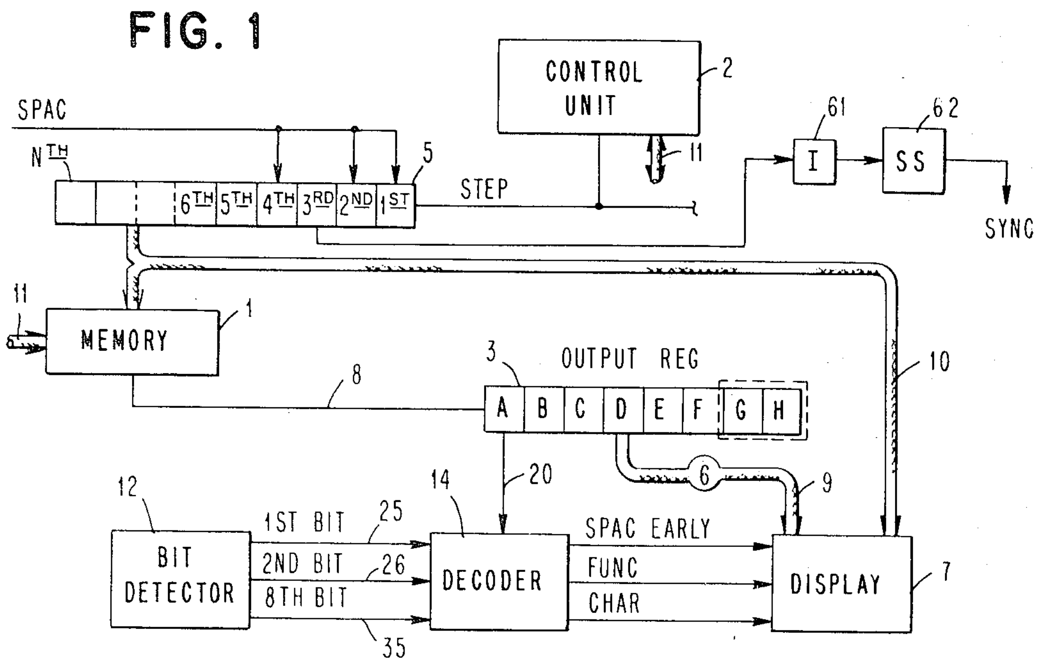
FIG. 1 depicts an overall block diagram of one embodiment of the present invention.

FIG. 1 depicts a preferred embodiment in which the memory 1 is a conventional magnetic core memory having serial, bit by bit, readout of memory words. The display 7 includes in the preferred embodiment a CRT having conventional position control circuitry and conventional character generation circuitry to be discussed further in connection with FIG. 3.

Definitions

Before proceeding further, the terms "character," "function," "word," and "space," along with those terms used in combination with other terms, will be defined.

The term "character" designates those graphic representations which are displayed on the display screen. A primary example of a character is the letter A or the letter B or any of the other letters, numbers, or symbols of which conventional alphanumerics are typical examples. Of course, a character by definition may be any graphical representation. The total number of characters which can be displayed by the apparatus is designated as the full character set. In the case of the present invention, one character is distinguished from another character within the apparatus itself by a character code which character code is six bits in length so that a total of 64 characters may be represented. Under some conditions, one of the character codes may be designated to represent no character, that is, a character code which designates the absence of a character. The absence of a character leaves a blank position on the display screen and such a character is often called a "space character."

The term "function" signifies control operations which enter, identify, modify, delete, or otherwise manipulate the information which is to be displayed. As previously mentioned, functions may be categorized into regenerative functions such as underscoring which occur each display cycle or as limited occurrence functions which only occur once out of many display cycles. Function codes, like character codes, are employed in the apparatus to distinguish between different functions to be performed and may also be up to six bits in length.

The term "word" designates combinations of eight bits and, when those eight-bit words are stored in memory, they are called "memory words." The "memory words" should be distinguished from the normal English language words. The memory words, stored in memory addresses, contain character codes or function codes (each up to six bits in length) as well as two additional bits defined as a control field. As described hereinafter in connection with FIG. 4*a*, B0 and B1 of each memory word comprise the control field and bits B2 through B7 form a data field which is sometimes used to contain either a character code or a function code depending on the nature of the control field.

The term "space" is employed to designate the absence of a character. In accordance with the present invention, the absence of a character being displayed at a particular address on the display screen can occur as a result of two conditions. First, when B0 of any memory word is in a 0 state, a space is displayed for that word. Additionally, even though B0 of a memory word is 1, a space is displayed when the contents of bits B2 through B7 contain a function code. As far as the display screen is concerned, a space caused by B0 being a 0 is identical to a space caused by bits B2 through B7 containing a function code. For purposes of clarity, however, a space generated as a result of B0 being a 0 is called a true space and a space resulting from bits B2 through B7 being a character code is designated as a function space.

SERIAL READOUT MEMORY AND CRT EMBODIMENT

In FIG. 1, the memory 1 has each bit location in each word therein addressed by addressing means 5 which is in the form of a conventional binary counter having N stages. For a memory having 4,096 bit locations, counter 5 has N equal to 12. Of course, the memory and counter can be considerably larger. In the present invention, memory words are arbitrarily defined to be eight bits in length and accordingly, a 4,096-bit memory is capable of storing 512 words.

The addressing means 5 serially steps through each bit location in memory 1 causing, at each STEP pulse from control unit 2, a bit of a memory word to be read out over output bus 8 to the output register 3. The output register 3 is a conventional shift register having eight stages lettered A, B,...,H. When a full word (eight bits) has been read out over the bus 8 to the output register 3, a portion of the output register contents is gated over bus 9 to the display 7 where a function may be performed or where a character may be generated and displayed by the display 7.

FIG. 4*a* depicts the format of words in memory where the first two bits B0 and B1 are the control field and the remaining six bits B2 through B7 form a field which contains either a character code or a function code (or nothing when a true space exists).

In a serial readout embodiment of the present invention, when the first bit, B0, of any of the 512 words is read out from memory 1, that bit appears in the A stage of register 3 at count time 000. Thereafter, the second bit, B1, is readout at 001 time so that B1 appears in stage A and B0 appears in stage B and so forth for each additional bit as depicted in connection with FIG. 5.

Control Field Definition

With reference to FIG. 4*b* and by definition, B0 in the control field of every word specifies whether or not the word contains a true space. By definition, when B0 is a 1, a character code or a function code follows. When B0 is a 0, then the word is a true space. When B0 is a 1, then B1 determines whether the remaining six-bit data field contains a character code or a function code. By definition, when B1 is a 0, the remaining six bits define a function and when B1 is a 1 the remaining six bits define a character. Any six-bit code may be used to define the character. For example, a standard BCD interchange code may be employed where the character A is represented by 110001, the character B by 110010, C by 110011 and so forth. Similarly, any code may be employed to represent the functions. For example, in the present invention the code 110001 is used to initiate an underscore operation and 110010 is used to terminate an underscore operation.

Control Field Decoder

As each word is read out of the memory 1, the decoder 14 of FIG. 1 determines by examining the control field whether a true space, function, or character exists. The decoder 14 does this by examining only the first stage A of the register 3 and knows when to interrogate that stage A because of the inputs from bit detector 12. The bit detector 12 and decoder 14 together comprise control field decoder means and are shown in more detail in FIG. 2.

Figure 2:
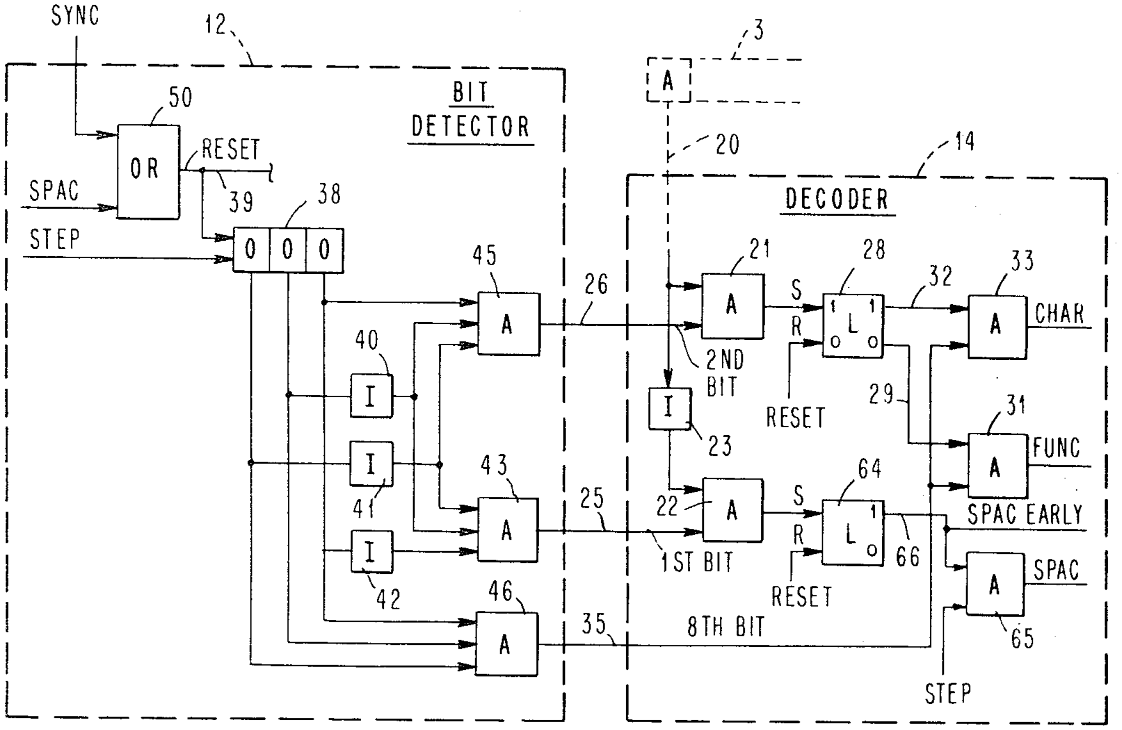
FIG. 2 depicts, in further detail, the bit detector and decoder which form the control field decoder of FIG. 1.

In FIG. 2, the decoder 14 senses the 1 or 0 condition of stage A of the register 3 in FIG. 1 by the line 20 which connects to the conventional AND-gate 21 and conventional AND-gate 22 through conventional inverter 23. AND-gate 22 is energized when the first bit, B0, of any memory word appears in the stage A of the register 3. The gate 22 is energized by line 25 from the bit detector 12 to be described hereinafter. If B0 is a 0, that 0 is inverted in inverted in inverter 23 so that the AND 22 is satisfied to generate an output signal, SPAC EARLY, indicative of a true space condition. If B0 is a 1, AND 22 is not satisfied and therefore the next bit, B1, is gated into the stage A of the register 3 by the next STEP pulse.

Gate 22 has its output connected to a space latch 64 and when satisfied gate 22 sets latch 64 in the 1 condition delivering a SPAC EARLY signal as an output from latch 64. That SPAC EARLY signal is one input to gate 65 and is also connected to the character generator of FIG. 5 through OR 67 causing the generator to display a space. The gate 65 is satisfied when both the SPAC EARLY and a STEP pulse are simultaneously present. The SPAC signal is connected to OR 50 of FIG. 2 and to the counter 5 of FIG. 1. The SPAC signal increments the counter 5 to the next word by updating the fourth stage of counter 5, that is, changing it to a 1 if it was a 0 or changing it to a 0 if it was a 1 and propagating the carry to the fifth bit. The SPAC signal also operates to reset the first and second stages of counter 5 to 0. These resetting and incrementing functions are implemented in a conventional manner.

When B0 is a 1, then when B1 is gated into stage A, line 26 from the bit detector 12 is energized and renders one input to the AND 21. If B1 is a 0, AND 21 is not satisfied, therefore, latch 28 remains reset to 0 (it having previously been reset) and its 0 output 29 is connected as one input to the AND 31. If, however, B1 is a 1, AND 21 is satisfied thereby setting latch 28 to a 1, thereby removing the pulse from line 29, and applying a pulse via line 32 to the AND 33. When all eight bits of a memory word have been gated out of memory into the output register 3, an eighth bit signal is generated on line 35 which is applied to both gates 31 and 33. The output from whichever of the lines 32 or 29 is set, as determined by the 1 or 0 condition of latch 28, controls whether a CHAR or a FUNC signal is generated, respectively. The SPAC output from gate 65, the CHAR output from gate 33, and the FUNC output from gate 31 are applied to various lines throughout the apparatus of the present invention as labeled in the drawings and to be hereinafter further described.

The bit detector 12 in FIG. 2, as indicated, applies output signals on lines 25, 26, and 35 indicative of when the first, second, and eighth bit of each word, respectively, is being gated into stage A of register 3. The detector 12 includes a conventional three-stage binary counter 38 which counts from 000 through 111 as the first through eighth, respectively, bits of each word are gated into the register 3. Counter 38 is stepped by the STEP signal from the control unit 2 which signal also steps the addressing means 5. Each of the outputs for the stages of the counter 38 are decoded through inverts 40, 41, and 42 by AND 43 to give a first bit signal on line 25 when counters 38 are in the 000 condition. Similarly, counter 38 is decoded through inverts 40 and 41 and the direct output from stage 1 by AND 45 which gives a second bit signal on 26 when the counter 38 is in the condition 001. In a similar manner, the outputs of counter 38 are decoded and AND 46 to render an eighth bit signal on line 35 when the counter is in the 111 condition.

Counter 38 is reset to a 000 condition by OR 50 by a SYNC pulse derived from the third bit position of counter 5 in FIG. 1. Each time the third bit position of counter 5 is switched from 1 to 0, the invert 61 and single shot 62 supply the SYNC pulse which assures that the counter 5 and the counter 38 operate in synchronism. Additionally, the OR 50 is energized by the SPAC pulse from gate 65 when it is satisfied by space latch 64 coincident with a STEP signal.

The output of OR 50 besides resetting the counter 38 to all 0's also resets the latches 28 and 64 to their 0 state. Since it is desirable that the first bit signal on line 25 not precede the signal from inverter 23 as derived from stage A of the output register 3, suitable conventional delay (not shown) may be included in gate 43 or line 25 for insuring that the stage A has had an opportunity to receive the B0 signal from memory 8 and to convey it to AND 22.

Function and Character Decoding

While the bit detector and decoder of FIGS. 1 and 2 function to determine the space, function or character nature of the word read from memory 1, the apparatus of FIG. 3 function to make use of that memory word in accord with its indicated nature. In FIG. 3, bus 9 connects through a function gate 68 to a function decoder 70 or through a character gate 71 to a character decoder 73. The function gate 68 is rendered operative when gate 31 of FIG. 2 renders a FUNC output signal. Similarly, character gate 71 is rendered operative when gate 33 of FIG. 2 renders a CHAR output signal. Gates 68 and 71 are conventional and may each include a plurality of two-way AND's, one for each signal line in the bus 9. One input to each of those two-way AND's, of course, would be a signal line from the bus 9 and the other input to the AND's would be either the FUNC line in the case of gate 68 or the CHAR line in the case of gate 71. Decoders 70 and 73 are also conventional and appropriately include in the present embodiment any binary coded decimal decoder.

The character decoder 73 is connected in a conventional manner to a conventional character generator 75 which generates the character and causes it to be traced on the screen of CRT 76. The character, when it is displayed at a display address controlled by position control circuitry 77 which is connected by bus 10 to the address counter 5 of FIG. 1. The manner of deriving positioning control signals from the counter 5 is well known in the art. In the present embodiment where each row of display addresses contains 32 character positions defined by 32 memory words totaling 256 bits, the fifth through eighth stages of counter 5 are, for example, connected to generate 32 analog step signals in the X-direction and the remaining nine through 12 stages are connected to generate 16 analog step signals in the Y-direction. For each of the 16 rows, the display is stepped, therefore, across 32 words, that is, 32 display addresses.

The character generator 75 has an input 66 from OR 67 which is operative, in a conventional manner, when energized to underscore each character displayed on CRT 76. Line 66 is energized whenever a SPAC EARLY or FUNC input is received from decoder 14 of FIG. 2.

OPERATION

The operation of the invention will be described with reference to the display of the expression "THE EVIL MEN DO LIVES AFTER THEM, THE GOOD IS OFT INTERRED" without any regenerative function and thereafter, with reference to the display of that same expression "<u>THE</u> <u>EVIL</u> <u>MEN</u> <u>DO</u> <u>LIVES</u> <u>AFTER</u> <u>THEM,</u> <u>THE</u> <u>GOOD</u> <u>IS</u> OFT INTERRED" including an underscore which is implemented using a regenerative function.

Figure 6A:
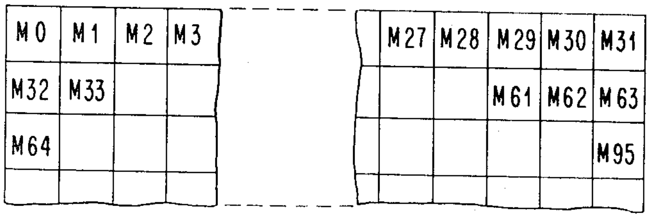
FIG. 6*a* and FIG. 6*b* demonstrate the one-for-one correlation between the memory addresses and the display addresses, respectively.
Figure 6B:
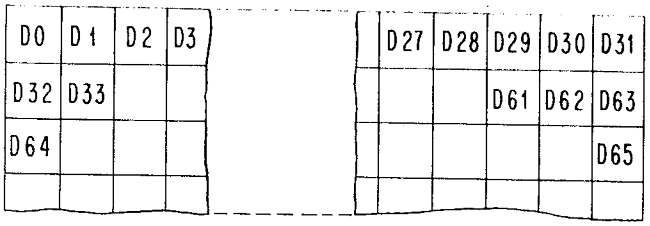

FIG. 6a depicts the memory 1 of FIG. 1 as having the words M0, M1,...organized in rows of 32 words per row. Each those words contains eight bits in the format of FIG. 4a. FIG. 6b depicts a display screen having display addresses DO, D1,..., corresponding to the words M0, M1,..., respectively.

Figure 7A:
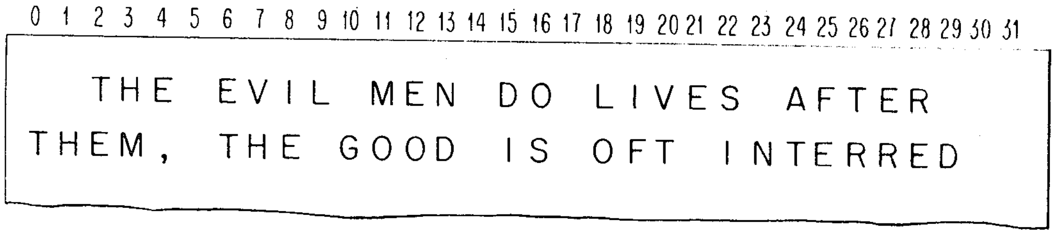
FIG. 7*a* and FIG. 7*b* demonstrate an exemplary text display without and with, respectively, a regenerative underscore function.

FIG. 7a depicts the above-quoted expression displayed at the display addressed of FIG. 6b. More particularly, display addresses D0 and D1 are empty. Display addresses D2, D3 and D4 contain the letters T H E, respectively, and location D5 contains a space.

In order for the display addresses to contain the characters and spaces indicated, the memory words of FIG. 6a must correspondingly contain the appropriate bit configurations. Accordingly, in memory words M0 and M1, both B0 bits contain a 0 since no regenerative function is to be performed and a true space indication must be given. Memory word M2, however, must have B0 set to 1, and B1 set to 1 thereby indicating that the field B2 through B7 contains the character code for a T which may be 010011, for example. In a similar manner, memory word M3 has its control field, B0 and B1, with each bit set to 1 with the field B2 through B7 containing the character code for H which may be 111000, for example. In a similar manner, each of the other memory words contains an appropriate character code and control field to spell out the quoted expression.

Figure 7B:
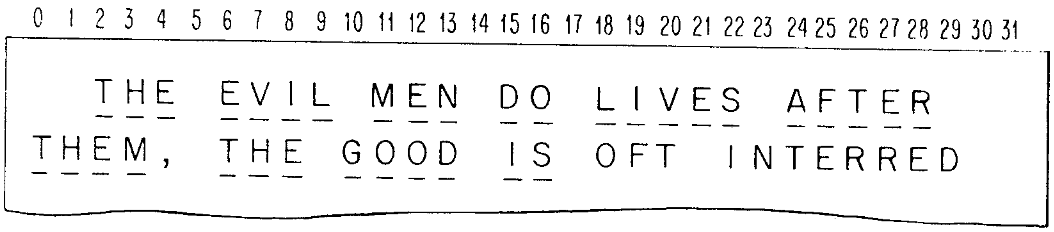

Referring to FIG. 7b, the display locations of FIG. 6b are shown to contain the above-quoted expression modified, however, by the regenerative underscore function which underlines each character displayed. In order to implement this regenerative underscore function, each of the display addresses and each of the corresponding memory addresses which contained character information, as described in the example of FIG. 7a, are not modified in the memory when the regenerative function is to be performed. However, the location D1 preceding the first T in the first "THE" has the corresponding memory word, M1, modified from its previous status. In connection with FIG. 7a, M1 had B0 equal to 0 thereby indicating a true space. For the regenerative underscore function, however, B0 of M1 is set to 1 and B1 of M1 is set to 0. As indicated in connection with FIG. 4b, the B0, B1 content of 1, 0, respectively, indicates that the remaining field B2 through B7 of M1 contains a function code. If the B2 through B7 field contains the initiate underscore code 11001 then the underscore function is decoded and causes all of the subsequent characters to be underscored as shown in FIG. 7b. If the terminate underscore code 110010 is placed in memory word M49 (which is the word corresponding to the space after the S in "IS"), the underscore operation is terminated for all subsequent characters. Therefore, the words "OFT INTERRED" are not underscored.

Apparatus Operation (Nonregenerative Operation)

The operation of the FIG. 1, FIG. 2 and FIG. 3 circuits to carry out the display operation described above in connection with FIGS. 7a and 7b begins when control unit 2 of FIG. 1 steps counter 5 from its all 1 status to its all 0 status thereby commencing a new display cycle. When counter 5 is all 0's, the first bit, B0, of word M0 is read into the A stage of the output register 3. The STEP pulse from control unit 2 then steps counter 5 to all 0's simultaneously steps counter 38 in FIG. 2 to all 0's so that the bit detector 12 is operative to energize the first bit line 25 thereby allowing gate 22 in decoder 14 to detect the status (1 or 0) of the first bit of word M0. Since as shown in FIG. 7a, the first display address D0 is a space and since there is no regenerative function indicated in the FIG. 7a operation, B0 of M0 is a 0 thereby indicating a true space. The 0 of B0 set in stage A satisfies gate 22 thereby setting the space latch 64 to the 1 position. The set latch 64 energizes its 1 level output 66 giving rise to a SPAC EARLY signal which is connected through OR 67 to the character generator 75 of FIG. 3 causing the generator to display a space on the CRT 76. The location of the space is controlled by a conventional position control device 77 according to the address information received from counter 5 via the bus 10.

Since latch 64 is set by B0 of M0, the next STEP SIGNAL from control unit 2 is operative to gate that latch condition to gate 65 to generate a SPAC signal which is operative to reset counter 38 and increment counter 5. Counter 38 of bit detector 12 is reset to all 0's when the SPAC signal is applied to OR 50 thereby generating the RESET output on line 39. That RESET output additionally functions to reset latch 28 and latch 64. In the example given, latch 28 is in the 0 state so that the RESET pulse merely operates to maintain that latch in the 0 state. Latch 64, however, is in the 1 state so that the RESET signal is operative to reset it to 0. The SPAC signal is also connected to the first, second, and fourth stages of counter 5. The SPAC signal is operative to increment the fourth stage, that is a 1 in the fourth stage is set to 0 generating a carry to the fifth stage and a 0 in the fourth stage is set to 1. The first and second stages of counter 5 are reset to 0 by the SPAC signal.

The first and second stages of counter 5 are conventional having reset inputs and the fourth stage has the SPAC input connected in the same manner as a carry from the third stage.

In the example given in FIG. 7a, the fourth stage is in the 0 stage so that it is set to 1 when the SPAC signal resulting from word M0 is received so that counter 5 is then in the state of all 0's with the exception of the fourth stage which has a 1. With counter 5 in that status, memory 1 is addressed by counter 5 to retrieve the first bit of word M1 which is placed in stage A of output register 3. In the case of FIG. 7a without any regenerative underscore, B0 of M1 is also a 0 so that upon energization of the first bit line 25, gate 22 is again satisfied to set latch 64 to display a space at the D1 address of CRT 76. On the next STEP signal from control unit 2, counter 5 is again conditioned by a SPAC signal such that the first and second stages are again set to 0 (the third stage remains at 0 having never been changed) and the fourth stage is reset to 0. Therefore the status of the counter 5 is a 1 in the fifth stage with all other stages at 0. With counter 5 in that condition, word M2 is addressed reading bit B0 into stage A of output register 3. Since, as is apparent from FIG. 7a, display position D2 contains the character T, B0 of M2 is a 1 and therefore, gate 22 is not satisfied when the first bit signal is received on line 25. Accordingly, latch 64 remains in a reset position without an output on line 66. The next STEP signal from control unit 2 operates to increment counter 5 (the first and fifth stages set to 1 and all others to 0) thereby reading out the B1 bit of M2 and placing it in stage A of output register 3. Since D2 contains the character H, B1 of M2 is a 1 Pthereby satisfying gate 21 when the second bit signal is received on line 26. Gate 21, being satisfied, is operative to set latch 28 with a 1 output which provides one input to the gate 33. Thereafter, each remaining bit, B2 through B7, is read out from the memory 1 into the output register 3 during each of the six succeeding STEP pulses. When B7 is positioned in stage A, counter 38 in bit detector 12 is set to all 1's as are the first, second, and third stages of counter 5. The 111 output from counter 38 is operative to satisfy gate 46 thereby generating an eighth bit signal on line 36 which functions to satisfy the gate 33 in decoder 14 thereby generating the CHAR output.

The CHAR output is operative to satisfy the character gate 71 which gates the stages A through F output register 3 to the character decoder 73. Since the character to be displayed is a T and a standard code for such a character is 010011 that 010011 code will have been the one read into output register 3 which will be gated through gate 71 to the character decoder 73. Character decoder 73 is responsive to that code to send a signal to the character generator 75 which causes generator 75 to generate the appropriate signals for displaying a T. The display address at which the T is displayed is, of course, D2 and that address is supplied to the position control 77 over bus 10. After B7 of word M2 has been read into register 3 and gated to the character decoder 73, counter 5 has stages 1 through 3 and 5 in the all 1 condition and counter 38 is in the all 1 condition. On the next STEP signal, all of the first through third stages are reset to 0 sending a carry to the fourth stage leaving 1's in the fourth and fifth stages. When the third stage is set to 0, a signal through inverter 61 is conveyed to the single shot 62 thereby generating the SYNC signal which feeds OR 50 in the bit detector 12 thereby insuring that the counter 38 is all 0's in sync with the first three stages of counter 5 and additionally generating the RESET signal on line 39. As previously indicated, the RESET signal sets the latches 28 and 64 to the 0 condition.

With counter 5 having the fourth and fifth bits in the 1 condition, memory 1 is addressed to read out the B0 of word M3. Since M3 contains a character H, B0 of M3 is a 1 and the operation continues in the manner described in connection with M2.

Apparatus Operation (Regenerative Function)

When a regenerative function such as indicated in FIG. 7b is to be carried out, the operation as described above in connection with memory word M0 and display address D0 is the same. However, for a regenerative function B0 of word M1 is detected, in stage A of register 3, as a 1 so that gate 22 is not satisfied when the first bit signal is received on line 25. Latch 64 remains reset, therefore a no SPAC EARLY or SPAC signal is generated and B1 of M1 is read into stage A. B1 is a 0 and, therefore, gate 21 is not satisfied leaving the latch 28 in the reset stage having a 0 output on line 29 which is one input to the gate 31. Thereafter, the remaining bits B2 through B7 are read from memory 1 into the output register 3. The field B2 through B7 of M1 contains the code 110001 which is operative to initiate an underscore operation. When counter 38 goes to 111, gate 46 is satisfied thereby generating the eighth bit signal on line 35 which this time satisfies gate 31 generating the FUNC signal.

The FUNC signal satisfies gate 68 in FIG. 3 which gates the underscore function code to the function decoder 70 which is operative to set a function latch 80 to its 1 state in the function register 72. When latch 80 is in the 1 state, its output on line 82 causes the character generator 75 to underscore every character which is displayed. The function register latch 80 remains set until some subsequent time when a signal is decoded from decoder 70 which resets it to 0. Such a resetting code is placed, for example, in the memory word M49 corresponding to display address D49 (appearing in FIG. 7b after the word "IS" and before "OFT."

FURTHER EMBODIMENTS AND VARIATIONS

While a preferred embodiment including a serial readout magnetic core memory in combination with a CRT has been described, a parallel readout memory may be employed. For example, in FIG. 1, the output from memory 1 may be modified so that line 8 is a parallel bus including eight bit positions for simultaneously reading out each bit of a memory word into the register 3. In this parallel readout mode, the output line 20 from register 3 is modified so that the output from stage H is connected directly (not shown) to the inverter 23 in decoder 14 of FIG. 2 and the output of stage G is connected directly to the input of gate 21 in FIG. 2. Since positions G and H are not actually used in the serial readout operation previously described, they of course can be eliminated for that serial readout mode.

When a parallel mode of readout is employed, it may be desirable to eliminate the B0 bit in the control field of every word and set aside a character code for indicating spaces. In this variation, a true space would be indicated by decoding the space character code and the function space would be still indicated by detecting a 0 in the B1 position of every word.

While the control field may be shortened or expanded as suggested, so too may the data field B2–B7 be shortened or expanded as desired. Accordingly, the word size in memory is not important and may be made any selected length. In a similar manner, the number of character positions, that is, display addresses per row need not be fixed at 32 as any number may be selected. Similarly, more than 16 rows may be included in the display. While the words have been designated as containing binary bits, of course, analog or other forms of data may be employed in either or both of the control and data fields.

While the memory width in FIG. 6a included 32 words which exactly corresponded with the display address width per row, this physical relationship need not be maintained. For example, the memory could be organized into 64 words in width while still maintaining 32 display addresses per display row. The important point is that there is a one-for-one correlation between memory addresses and display addresses and the actual physical width of each is unimportant.

While only one regenerative function, namely the underscore function, has been discussed, many other regenerative functions may be included. For each regenerative function, a latch is provided in register 72 which operates analogously to the latch 80 for the underscore function. For example, a BRIGHT latch 80a may be employed which, when set, causes the character generator to brighten all displayed characters when latch 80a has a 1 level output. Similarly, a blink regenerative function may be employed to make all characters blink on and off when the BLINK latch 80b has a 1 level output.

Regenerative functions may be interleaved within a display image. For example, with reference to FIGS. 7b and 6a an initiate underscore character code was positioned in memory word M1 before the character T. To interleave, memory word M5 contains an initiate blink regenerative function code and memory word M10 contains a terminate blink regenerative function code. With this variation in the operation, the FIG. 7b quotation would be displayed as shown with the exception that the word "EVIL" would blink on and off while all other words would not blink on and off. Both the blinking and nonblinking words, however, would still retain the underscore.

While no detailed explanation as to the input to memory 1 has been given, control unit 2 includes an output 11 for loading memory 1 with the appropriate words containing the desired control fields and character or function codes. Any conventional input means may be included in control unit 2 such as a manual keyboard, a programmed general purpose computer, or other similar conventional devices for reading into and out of memory 11 at appropriately selected addresses.

While the invention in the preferred embodiment has been described in connection with two dimensional displays which have display addresses defined by X- and Y-coordinates, the invention also includes three-dimensional displays. In three-dimensional displays it is also necessary that a mapping arrangement exists between the memory addresses and the display addresses and that the information to be displayed be of the type having spaces between characters so as to permit insertion of function codes.

Although the apparatus of the present invention includes an incrementing to the next memory word when a space indication is detected in the control field, one of the many regenerative functions which may be defined and placed in the data field is a skip-ahead function which also operates to increment or decrement the address counter one or more words. For example with reference to FIG. 6b, a regenerative function code may be placed in the word corresponding to address D0 which causes the address counter to skip ahead to address D64 without display at any addresses in between.

Although "words" in a preferred embodiment have been interpreted to be comprised of binary bits, other forms of words may be employed. For example, video or other analog signals may be stored in a memory in accordance with the present invention, the only requirement being that each word include a control field and a data field portion. One contemplated mode of operation would include a control field consisting of binary bits coupled with a video signal in the data field. Many variations, of course, of analog and binary signals may be employed.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A display system comprising:

a display having a plurality of display addresses where each display address displays a character or a space;

a memory means having a plurality of memory addresses each containing a memory word where each memory address is associated with a different corresponding display address, where each memory word has a control field and a data field, and where each data field is capable of storing either a representation of a character to be displayed or of a function to be performed;

address means for cyclically addressing the plurality of memory addresses so as to cyclically read out the memory words;

decoder means for decoding the control field of each word readout and for generating a control signal which indicates whether the data field contains a representation of a character to be displayed or a representation of a function to be performed; and control means responsive to the control signal for causing said display to display a character when said control signal indicates that the data field contains a representation of a character to be displayed, and to display a space when said control signal indicates that the data field contains a representation of a function to be performed.

2. The apparatus of claim 1 wherein the control field and data field of each memory word each includes a plurality of bits, wherein said address means includes means to read out each addressed word a bit at a time starting with the control field, wherein said decoder means includes means for generating a first control signal for each word read out when the word read out has a predetermined first condition in one or more bits of the control field; and means responsive to the first control signal to increment said address means to the next memory address without completing the read out of the addressed word.

3. The apparatus of claim 2 wherein said decoder means includes means for generating a second control signal for each word read out when the word read out has a predetermined second condition in one or more bits of the control field, and means responsive to the second control signal for implementing a regenerative function.

4. The apparatus of claim 3 wherein said memory means includes an output register means connected to said memory means for receiving each memory word cyclically read out and wherein said control means includes means connected to said register means for decoding the data field of each memory word in a first manner in response to the first control signal and in a second manner in response to the second control signal.

5. A display system comprising:

a display having a plurality of display addresses where each display address displays a character or a space;

a memory having a plurality of memory addresses containing a plurality of memory words where each memory address is associated with a different corresponding display address, where each memory address includes a memory word having a control field and a data field, and where each data field is capable of storing either a representation of a character to be displayed or a function to be performed;

output register means connected to the memory for receiving memory words;

address means connected to the memory for cyclically addressing the plurality of memory addresses so as to cyclically read out the memory words into the output register means;

control field decoder means connected to the output register means for decoding the control field of each word read out to generate control signals which indicate whether the data field contains a representation of a character to be displayed or a representation of a function to be performed; and data field decoder means, connected to said output register means, to said control field decoder means and to said display, for decoding data fields of words read out; said data field decoder means operative to decode data fields in a first manner to generate character display signals in response to a control signal which indicates that the data field contains a representation of a character, and in a second manner to generate space display signals and to implement a function in response to a control signal which indicates that the data field contains a representation of a function.

6. The apparatus of claim 5 wherein said data field decoder means includes a character gate connecting said output register means to a character decoder and includes a function gate connecting said output register means to a function decoder whereby the control signal which indicates that the data field contains a representation of a character actuates said character gate and the control signal which indicates that the data field contains a representation of a function actuates the function gate.

7. The apparatus of claim 6 wherein said display includes a character generator and wherein said data field decoder means includes a function register connected to said function decoder, said function register including one or more latches setable and resetable by said function decoder, said latches connected to said character generator and operative when set to cause said character generator to cause a function to be executed at each display address displaying a character.

8. The apparatus of claim 7 wherein said display includes position control means for causing the display information to be positioned at the display addresses and wherein said position control means is connected to said address means so that the display addresses are synchronized with the memory addresses.

9. A display system comprising:

a display having a screen with a plurality of display addresses where each display address displays a character or a space, having a character generator for generating characters and implementing functions at display addresses on the screen, and having position control means for controlling the display address at which characters are displayed and functions are implemented;

a memory having a plurality of memory addresses containing a plurality of memory words where each memory address is associated with a different corresponding display address, where each memory address includes a memory word having a control field and a data field, and where each data field is capable of storing either a representation of a character to be displayed or a function to be performed;

output register means connected to said memory for receiving memory words;

address means connected to said memory for cyclically addressing the plurality of memory addresses so as to cyclically read out the memory words a bit at a time into said output register means, and connected to said position control means so as to cyclically display the contents of each memory word at display addresses stepped in syncronism with the memory addresses;

control field decoder means connected to said output register means for decoding the control field of each word read out to generate a first control signal indicative of a space, a second control signal indicative of a character and a third control signal indicative of a function in the data field of the word read out, said control field decoder means including means responsive to said first control signal to increment said address means to the next memory address without completing the readout of the addressed word; and data field decoder means including; a character decoder, a function decoder, a character gate connecting said output register means in response to said second control signal to said character decoder, a function gate connecting said output register means in response to said third control signal to said function decoder, means connecting said character decoder to said character generator for displaying a character on the display screen, and a function register connected to said function decoder, said function register including one or more latches setable and resetable by said function decoder, said latches connected to said character generator and operative when set to cause said character generator to execute a function at each display address displaying a character.

* * * * *